United States Patent
Sexton et al.

(10) Patent No.: US 6,510,174 B1
(45) Date of Patent: Jan. 21, 2003

(54) APPARATUS, AND ASSOCIATED METHOD, FOR FACILITATING SETTING OF LINK PARAMETERS TO IMPROVE COMMUNICATION QUALITIES IN A RADIO COMMUNICATION SYSTEM

(75) Inventors: Thomas A. Sexton, Fort Worth, TX (US); Antti Lappetelainen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/452,084

(22) Filed: Nov. 30, 1999

(51) Int. Cl.[7] .............................. H04B 17/02
(52) U.S. Cl. .................. 375/213; 375/227; 375/228; 375/285; 375/296; 455/52.1; 455/54.2; 455/67.4; 455/69; 455/226.1; 370/252; 370/280; 370/317; 370/321; 370/337; 370/347; 370/442
(58) Field of Search ................... 375/259, 285, 375/295, 296, 358, 364, 211, 213, 220, 224, 227, 228; 455/9, 13.4, 10, 52.1–52.3, 54.1, 54.2, 67.1, 67.4, 69, 70, 89, 95, 151.2, 154.1, 226.1–226.4; 370/252, 278, 280, 294, 318, 317, 321, 336, 337, 347, 442; 329/322, 318, 353

(56) References Cited

U.S. PATENT DOCUMENTS

| | | | |
|---|---|---|---|
| 4,635,247 A | * | 1/1987 | Tejima ...................... 370/241 |
| 5,758,278 A | * | 5/1998 | Lansdowne ............... 340/825.2 |
| 5,768,684 A | * | 6/1998 | Grubb et al. ............... 370/318 |
| 5,862,476 A | * | 1/1999 | Hasegawa .................. 455/422 |
| 5,881,101 A | * | 3/1999 | Furman et al. ............. 370/311 |
| 6,167,031 A | * | 12/2000 | Olofsson et al. ............ 370/252 |

* cited by examiner

Primary Examiner—Stephen Chin
Assistant Examiner—Dac V. Ha
(74) Attorney, Agent, or Firm—Federico Fraccaroli

(57) ABSTRACT

Apparatus, and an associated method, for facilitating selection of link parameters associated with a communication signal transmitted in a radio communication system, such as a GSM (global system for mobile communications) system which provides for GPRS (general packet radio service). Uplink sounding bursts are generated by a mobile station and transmitted to the network infrastructure of the radio communication system. The uplink sounding bursts are analyzed to determine channel conditions upon which the uplink sounding bursts are transmitted. Responsive thereto, selection is made of one or more link parameters of which subsequently-generated GPRS, or other, messages to be transmitted by the mobile station are to be formed. Indications of the selection are provided to the mobile station to permit formation of the subsequently-generated messages in manners which conform with the selected link parameter.

20 Claims, 4 Drawing Sheets

APPARATUS, AND ASSOCIATED METHOD, FOR FACILITATING SETTING OF LINK PARAMETERS TO IMPROVE COMMUNICATION QUALITIES IN A RADIO COMMUNICATION SYSTEM

The present invention relates generally to a manner by which to facilitate improved communication quality of a communication signal transmitted upon a communication link in a communication system, such as a cellular radio communication system. More particularly, the present invention relates to apparatus, and an associated method, by which to select a link parameter of a communication signal transmitted by a sending station upon the communication link. In one implementation, uplink sounding bursts are transmitted by a mobile station and utilized to determine the link parameters to be exhibited by subsequently-generated communication signals.

BACKGROUND OF THE INVENTION

Communication through the use of wireless communication systems has achieved wide popularity in recent years. Multi-user, wireless communication systems of improved capabilities have been implemented as a result of advancements in communication technologies. Communication pursuant to such multi-user, wireless communication systems can be affordably made, further increasing the popularity of usage of such systems.

In a wireless communication system, a communication channel formed between a sending station and a receiving station is a radio channel defined upon a portion of the electromagnetic spectrum. Because a radio channel forms a communication link, a wireline connection is not required to be formed between the sending and receiving stations to permit the communication of information between the stations. Communication by way of a wireless communication system is thereby permitted at, and between, locations at which the formation of a wireline connection would not be practical. Also, because a communication channel is formed of a radio channel, a radio communication system can be more economically installed as the infrastructure costs associated with a wireline communication system are significantly reduced.

A cellular communication system is exemplary of a wireless, multi-user radio communication system which has been made possible due to advancements in communication technologies and which has achieved wide levels of usage. A cellular communication system efficiently utilizes the portion of the electromagnetic spectrum allocated thereto. A plurality of fixed-site base stations are installed throughout a geographical area. By transmitting relatively low-power signals, the same frequencies can be reused at different locations throughout the geographical area. Thereby, communications can be effectuated between more than one set of sending and receiving stations concurrently at separate locations throughout the area encompassed by the cellular communication system.

Cellular standards have been promulgated relating to various types of cellular communication systems, and various types of cellular communication systems have been constructed corresponding to such standards. Several of such standards pertaining to a cellular communication system utilize TDMA (time-division, multiple-access) communication techniques. In a TDMA communication system, a carrier is divided into time slots in which a carrier—time slot combination defines a channel. Groups of adjacently-positioned time slots sometimes are together defined to form a frame, and group of frames are sometimes together defined as superframes or hyperframes.

In a particular communication session, one or more time slots per frame is allocated to a sending-receiving station pair to effectuate the communication of data therebetween. Because a single frequency bandwidth can be utilized to effectuate more than one communication session, improved communication capacity of the communication system is possible.

In an ideal communication system, a communication signal, when received at a receiving station, is substantially identical to the corresponding communication signal when transmitted by a sending station but delayed in time. However, in a non ideal communication system in which the communication signal must be transmitted upon a non ideal communication channel, the signal, when received at the receiving station is dissimilar to the corresponding communication signal when sent by the sending station. Distortion of the communication signal caused by transmission of the communication signal upon the communication channel causes such dissimilarities to result. If the distortion is significant, the informational content of the signal cannot be recovered at the receiving station.

In the aforementioned, TDMA cellular communication system, the communication channel, formed of a radio link, might be of characteristics which distort the values of the data bits of which a communication signal is formed. Fading, such as that caused by multi-path transmission or Rayleigh fading, alters values of the data bits of the communication signal during its transmission. Such distortion, if not corrected, reduces the communication quality levels of communications in a communication session formed between a mobile station and another station. Problems are sometimes most problematical when a mobile station is positioned at a cell-edge during a communication session. An increased path length between the mobile station and a base station resulting from position of the mobile station increases the possibility of increased levels of multi-path distortion as well as reducing the power level of a signal, when received at a receiving station. Also, co-channel, and other, interference with communications in other cells is more likely to be significant when the mobile station is positioned at a cell-edge.

Various techniques are utilized to overcome distortion introduced upon a communication signal as a result of transmission upon a non ideal communication channel. Channel encoding of the communication signal, prior to its transmission, for instance, increases the redundancy of the transmitted signal. By increasing the redundancy, the likelihood that the informational content of the signal can be recovered, once received at the receiving station, is increased. Alteration of the modulation format by which a communication signal is formed is sometimes also utilized to increase the likelihood that the informational content of the transmitted signal can be recovered. In a communication system which utilizes feedback acknowledgments of transmitted signal portions, power control schemes utilizing power control step size increments or decrements are utilized to increase, or decrease, the power levels of a transmitted signal, dependent upon channel characteristics. Selection of the number of times in which a signal portion is retransmitted or a selection of a timing of retransmission of a signal portion in the absence of positive acknowledgments also are utilized in some communication systems to overcome problems associated with non ideal channel conditions.

In some communication systems, communication signals are transmitted in bursts. Communication of GPRS (general packet radio service) messages proposed for the GSM (global system for mobile communications) family of standards is exemplary of communications which are effectuated in discrete bursts. Because of the bursty nature of the GPRS communications, additional difficulties in selecting the link parameters to communicate the messages is made more difficult. That is to say, GPRS messages are transmitted at intermittent intervals. The channel characteristics at the successive intervals during which the GPRS signals are transmitted might well differ significantly from one another. As a result, link parameters most appropriate to facilitate a good quality level of communications during one burst might be inappropriate to maximize communication quality levels at a subsequent interval.

If a manner could be provided by which to facilitate the selection of link parameters to communicate communication signals at improved communication quality levels, improved communication system performance would result.

It is in light of this background information related to radio communications that the significant improvements of the present invention have evolved.

SUMMARY OF THE INVENTION

The present invention, accordingly, advantageously provides apparatus, and an associated method, by which to select link parameters of a communication signal transmitted by a sending station upon a communication channel of a communication system. The link parameters are selected responsive to indications of channel characteristics of the communication channel upon which the communication signal is to be transmitted. The coding rate, modulation format, power control step size, retransmission limits, and timer value are all exemplary of link parameters selectable during operation of an embodiment of the present invention.

Dynamic selection of one or more link parameters is made during operation of the communication system. If a determination is made that the channel characteristics have changed, appropriate alteration of the one or more link parameters is made, thereby to facilitate communication of subsequently-generated communication signals at an optimal communication quality level.

In one aspect of the present invention, sounding bursts are generated by a mobile station operable in a cellular communication system. The sounding bursts are generated when the mobile station is in a standby state. The sounding bursts are, for instance, shortened versions of access bursts, conventionally utilized in existing GSM (global system for mobile communications) systems. The sounding bursts are transmitted by mobile stations operable in the communication system according to a schedule provided thereto, such as network-generated sounding schedules downloaded to the mobile station by way of the downlink channel. The sounding schedules are, for instance, associated with the ESN (electronic serial number) or other indicia which identifies the mobile station. Analysis of the sounding bursts, when detected at the network infrastructure of the communication system, permits the estimation of channel characteristics of the uplink channel. In a GSM system which provides for GPRS (general packet radio service) communications, the mobile station is instructed to transmit the sounding burst periodically in an assigned position of a GPRS multiframe defined in the communication system. And, by limiting the transmission of the uplink sounding bursts to occur only when the mobile station is in a radio resource (RR) standby state, the number of sounding bursts generated by a mobile station, and collectively all of the mobile stations in the communication system, is limited.

In another aspect of the present invention, channel estimation is performed at the network infrastructure of the uplink channel characteristics responsive to the detection at the network infrastructure of the uplink sounding bursts. As a result of the channel estimation, selection is made of values of one or more link parameters to facilitate communication of subsequently-generated communication signals by the mobile station to optimize better the communication quality of transmission of such signals. The coding rate, modulation format, power control step size, retransmission limits, and timer values are all exemplary of link parameters which are selectable responsive to channel estimation during operation of an embodiment of the present invention.

Responsive to the selection, a link parameter signal is generated and transmitted to the mobile station to inform the mobile station of the selected link parameter of which the subsequently-generated communication signal is to exhibit. Thereby, the mobile station is able to transmit communication signals in a manner to optimize communication quality levels.

In one implementation, an embodiment of the present invention is operable in a TDMA (time-division, multiple-access) cellular communication system, such as a GSM (global system for mobile communications) system which provides for GPRS (general packet radio service). As defined in such a system, GPRS messages are transmitted in discrete bursts. For instance, when a GPRS message is to be transmitted by a mobile station operable in the GSM system, a GPRS message is assigned to a channel formed of a frequency and time slot combination. In operation, an embodiment of the present invention determines link parameters of the GPRS message to be transmitted by the mobile station. Selection is made in a manner to facilitate communication of the message at an acceptable quality level. Sounding bursts are periodically generated by the mobile station when the mobile station is in a standby mode.

The sounding bursts are transmitted by the mobile station according to a sounding schedule which is provided to the mobile station by way of a control signal broadcast by the network infrastructure on a broadcast control channel. In the exemplary implementation, the sounding schedule broadcast by the network infrastructure assigns each mobile station to a sounding schedule responsive to the ESN of the mobile station. Thereby, a level of control is exerted upon the mobile stations when the mobile stations generate the sounding bursts on random access channels. The sounding bursts are detected at the base station system of the network infrastructure. Two or more sounding bursts are utilized at the network infrastructure to estimate the channel characteristics of the uplink channel upon which the sounding bursts are transmitted and upon which a GPRS message shall subsequently be transmitted. Responsive to the analysis and channel estimation, a selection is made of one or more link parameters by which the GPRS message is to be transmitted. The coding rate, modulation format, power control step size, retransmission limits, timer values, etc., are all exemplary of parameters selectable responsive to the analysis of the sounding bursts. A signal identifying to the mobile station the selection of the one or more link parameters is transmitted to the mobile station, and a GPRS message subsequently transmitted by the mobile station is generated in a manner complying with the instructions of the link parameter signal provided to the mobile station.

Thereby, a quantitative manner is provided by which to select the link parameter or parameters thereby to improve the quality of communications in the communication system.

In these and other aspects, therefore, apparatus, and an associated method, is provided for a mobile station operable in a radio communication system having network infrastructure and with which the mobile station communicates by way of a radio link. An uplink channel and a downlink channel are defined upon the radio link. The mobile station is operable alternately in a ready state and a non-ready state. When the mobile station is operated in a selected non-ready state, setting of link parameters to improve communication qualities of communications by the mobile station with the network infrastructure is facilitated. A burst signal generator generates and transmits uplink channel sounding bursts to the network infrastructure at selected times when the mobile station is operated in the selected non-ready state. A burst signal controller is coupled to receive indications instructing the mobile station of the selected times at which the burst signal generator generates the uplink channel sounding bursts. The burst signal controller is operable responsive thereto to control when the burst signal generator generates the uplink channel sounding bursts.

Additionally, in these and other aspects, apparatus, and an associated method, is further provided for the network infrastructure of a radio communication system in which a mobile station communicates by way of a radio link upon which an uplink channel and a downlink channel are defined with the network infrastructure. The mobile station is operable alternately in a ready state and a non-ready state. The network infrastructure facilitates setting of link parameters to improve communication qualities of communications by the mobile station with the network infrastructure. A burst signal detector is coupled to receive indications of burst signals generated by the mobile station. The burst signal detector determines values representative of the burst signals. A link parameter selector is coupled to receive indications of the values representative of the burst signals. The link parameter selector selects at least one link parameter to be exhibited by communication signals generated by the mobile station. And, a parameter link signal generator is coupled to the link parameter selector. The parameter link signal generator generates a parameter link signal for transmission upon the downlink to the mobile station to instruct the mobile station to cause communication signals generated thereat to exhibit the at least one link parameter.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
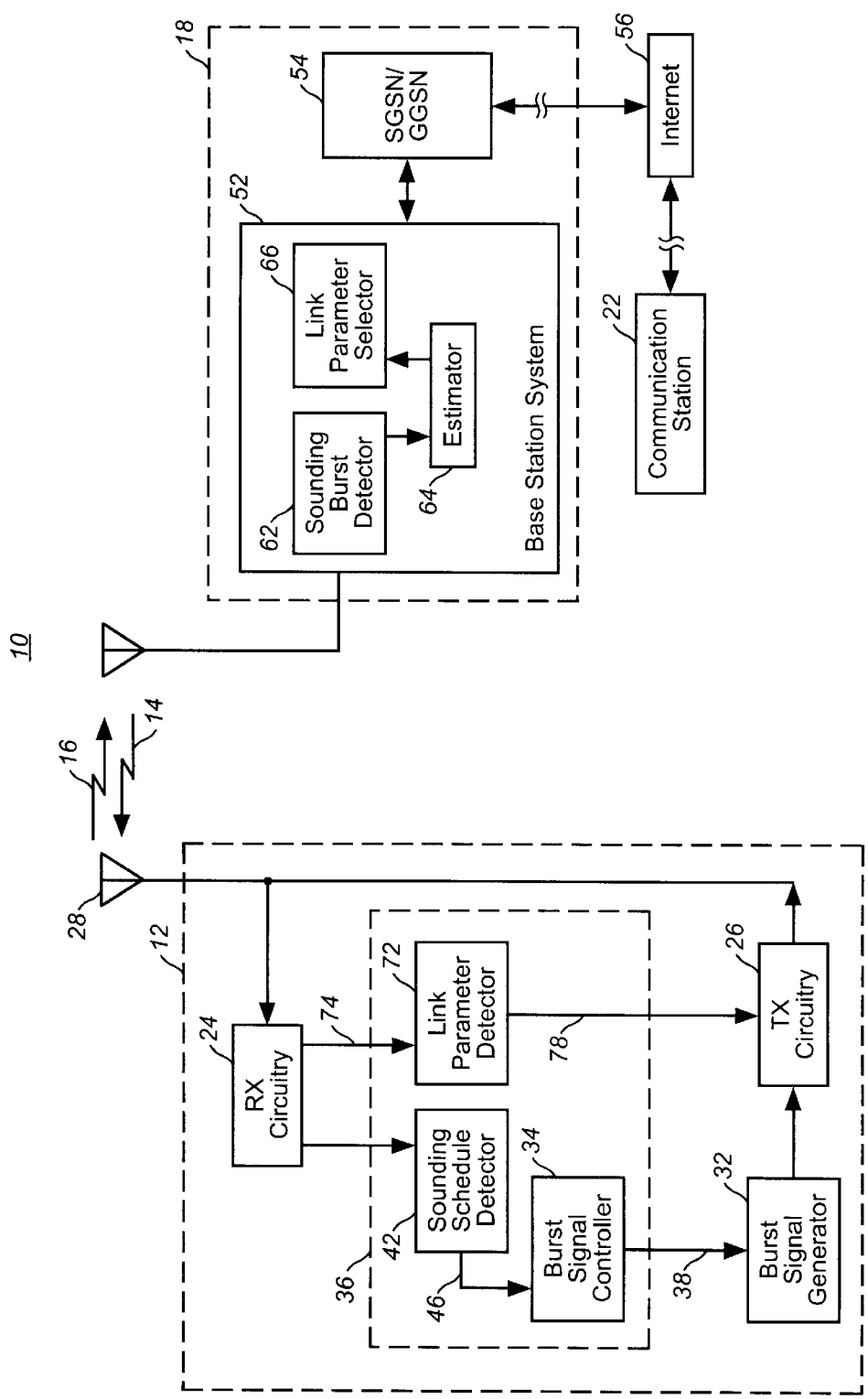
FIG. 1 illustrates a functional block diagram of a communication system in which an embodiment of the present invention is operable.

FIG. 1 illustrates a communication system, shown generally at 10, in which an embodiment of the present invention is operable. While the following description shall be described with respect to the exemplary system shown in FIG. 1, it should be understood that such description is by way of example only. An embodiment of the present invention is analogously operable in other types of communication systems. Accordingly, operation of an embodiment of the present invention can analogously be described with respect to such other types of communication systems.

The communication system 10 provides for wireless communications with a mobile station 12 by way of a radio link, here including downlink and uplink channels 14 and 16, respectively. In the exemplary implementation, the communication system 10 forms a GSM (global system for mobile communications) cellular communication system which provides for GPRS (general packet radio service). The mobile station 12 forms a GSM mobile station operable pursuant to the appropriate GSM standard to communicate by way of the downlink and uplink 14 and 16 and network infrastructure 18 with a communication station 22. Two-way communication is permitted between the communication station and the mobile station.

In conventional manner, the mobile station includes receiver circuitry 24 and transmitter circuitry 26 capable of receiving and transmitting, respectively, communication signals by way of an antenna transducer 28. The mobile station 12 of an embodiment of the present invention further includes a burst signal generator 32 operable to generate uplink sounding bursts which are converted into transmit form by the transmitter circuitry to be transmitted upon an uplink channel 16 to the network infrastructure 18. Control over operation of the burst signal generator is effectuated by a burst signal controller 34. The burst signal controller forms a portion of a control element 36 which controls operation of the receiver and transmitter circuitry of the mobile station. The burst signal controller 34 is coupled to the burst signal generator by way of the line 38 to control when the burst signal generator provides the uplink channel sounding bursts to the transmitter circuitry to be transmitted therefrom.

The controller 36 also includes a sounding schedule detector 42 coupled to the receiver circuitry 24 by way of the line 44 and, in turn, to the burst signal controller 34 by way of the line 46. A sounding schedule detector is operable to detect indications of a sounding schedule transmitted to the mobile station and received at the receiver circuitry 24 on a downlink channel 14. The sounding schedule is a schedule which identifies when the mobile station is permitted to send an uplink channel sounding burst. Indications of the sounding schedule are provided to the burst signal controller 34 and used to control when the burst signal generator generates the uplink channel sounding burst.

Uplink sounding bursts are transmitted by the mobile station according to the sounding schedule on an uplink channel 16 to the network infrastructure of the radio communication system to be applied to the Base Station System (BSS) 52 when received at the network infrastructure. The network infrastructure is further shown to include a SGSN/GGSN 54. And, SGSN/GGSN is coupled in conventional manner with the Internet 56 to which the communication station 22 is coupled.

The Base Station System is here shown to include a sounding burst detector 62 operable to detect sounding bursts generated by a mobile station, such as the mobile station 12, and received at the network infrastructure. Indications of the sounding bursts detected by the detector 62 are applied to an estimator 64. The estimator 64 estimates channel characteristics of the uplink channel 16 responsive to detection of two or more of the sounding bursts. Indications of the estimations are provided to a link parameter selector 66. The link parameter selector is operable to select a value of at least one link parameter associated with GPRS message to be subsequently generated by the mobile station. The link parameter, for instance, is the coding rate at which the message is to be encoded, the modulation format, the retransmission number, or timer values associated with transmission of the GPRS message.

The link parameter selector is coupled to a parameter of link signal generator 68. The signal generator 68 is operable to generate a signal of values representative of the value of the at least one link parameter selected by the selector 66 and to cause such signal to be transmitted upon a downlink channel 14 to the mobile station 12.

The controller 36 of the mobile station 12 further includes a link signal detector 72 coupled to the receiver circuitry 24 by way of a line 74. The link signal detector is operable to detect indications of the link signal received by the receiver circuitry of the mobile station. The link signal detector is further coupled to the transmit circuitry 26 by way of the line 78. When the link detector detects the indications of the link signal received at the receive circuitry, signals are generated on the line 78 to control the appropriate portions of the transmit circuitry to cause a GPRS message subsequently to be transmitted by the mobile station to exhibit the link parameter characteristics indicated by the indication detected by the link signal detector 72. Thereby, a manner is provided by which to control one or more link parameters associated with GPRS messages, or other signals, transmitted by the mobile station to the network infrastructure.

FIG. 2 again illustrates the mobile station 12 which forms a portion of the communication system shown in FIG. 1. The mobile station is again shown to include receive and transmit circuitry 24 and 26, as well as a controller 36. The controller 36 is further again shown to include a burst signal controller 34, a sounding schedule detector 42, and a link signal detector 72. Lines 44, 46, 74, and 78 are again shown to couple various of the functional elements together, as described previously with respect to FIG. 1. And, the burst signal generator 32 is again shown to be coupled to the transmit circuitry 26 to provide uplink sounding bursts to the transmit circuitry to be converted into a form to permit transmission of the uplink sounding bursts upon the uplink channel 16 to the network infrastructure.

The mobile station 12 is here shown further to include a data source 92 which forms the source of data, such as GPRS messages, which are to be communicated during operation of the mobile station. The data source and the burst signal generator are both coupled to a multiplexer 94 which forms a portion of the transmit circuitry. The multiplexer selectively passes an uplink sounding burst generated at the generator 32 or data generated by the data source 92 and applies the passed signal to a channel coder 96. The channel coder 96 encodes the signal applied thereto at a selected coding rate and generates a coded signal which is applied to an interleaver 98. The interleaver 98 interleaves the coded signal applied thereto according to an interleaving scheme and applies an interleave signal to a frame constructor 102. The frame constructor 102 formats the signal applied thereto into a frame format and generates frames of data which are applied to a modulator 104. The modulator 104 is operable to modulate the frames of data applied thereto according to a modulation and to apply modulated signals to a Variable Gain Amplifier (VGA) 106. The amplifier 106 generates an amplified signal to an up-converter 108 which up-converts the signal applied thereto in frequency to a transmit frequency. The up-converted signal generated by the up-converter is applied to a power amplifier 112 and is then provided to the antenna transducer 28 to be transduced thereat.

The link parameter selector 72 is here shown to be coupled to the channel coder 26, the modulator 104, and the variable gain amplifier 106, and therethrough to control the link parameter of a resultant signal generated by the mobile station. For instance, if an indication is provided to the link parameter detector that the coding rate should be a selected coding level, the channel coder 96 is caused to encode the signal applied thereto according to a selected coding rate. Analogously, the modulation format is correspondingly controlled by generation of appropriate control signals which are applied to the modulator 96. And, analogously, control over the power control step size, the retransmission number, and the timer values associated with transmission of signals by the mobile station 12 are all also effectuable.

Figure 2:
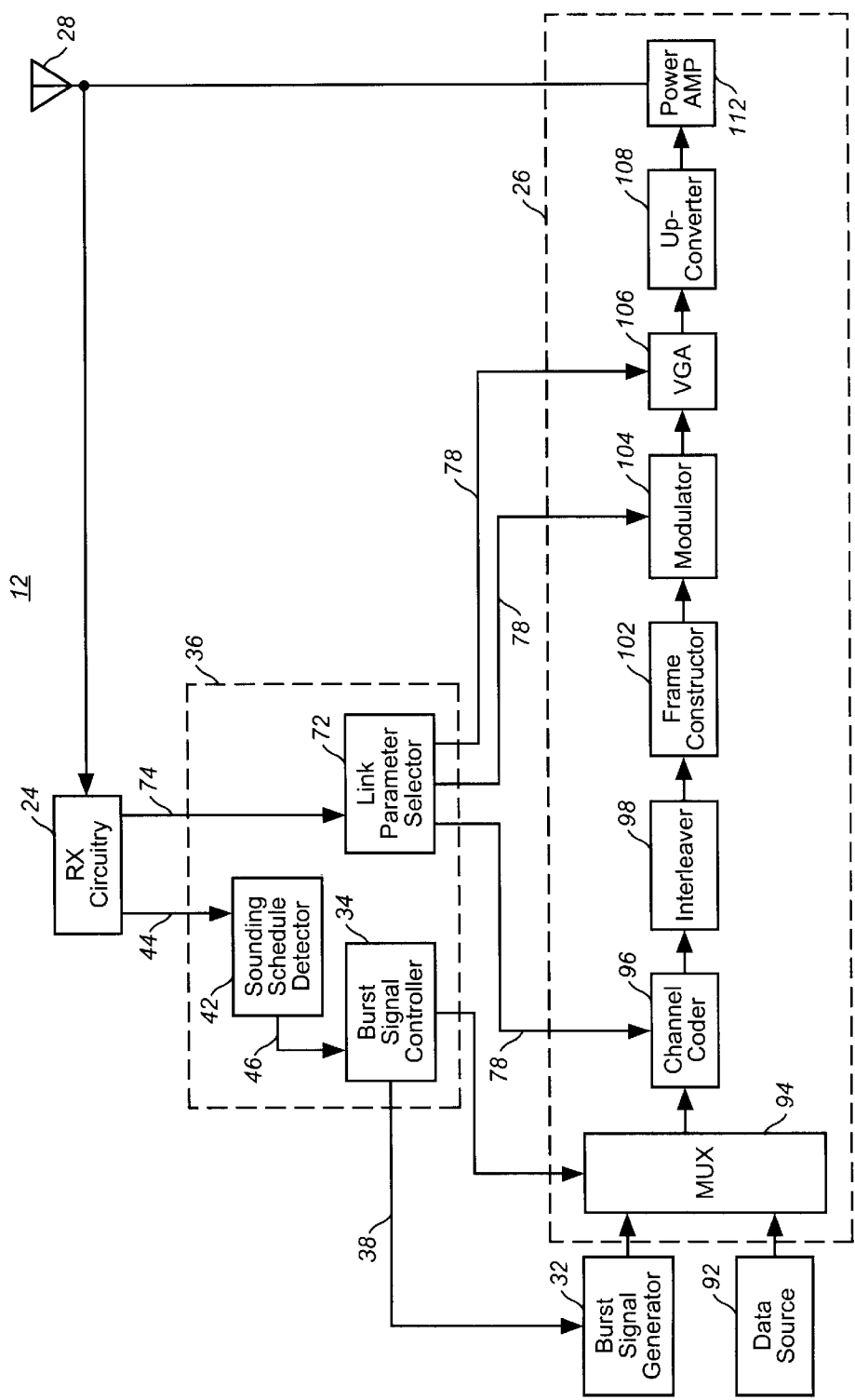
FIG. 2 illustrates a functional block diagram of a mobile station which forms a portion of the communication station shown in FIG. 1.
Figure 3:
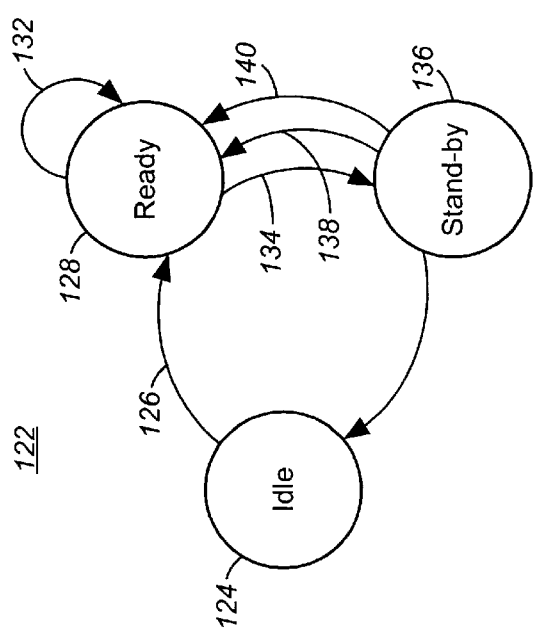
FIG. 3 illustrates a state diagram illustrating the states in which the mobile station which forms a portion of the communication system shown in FIG. 1 is operable.

FIG. 3 illustrates a state diagram, shown generally at 122. The state diagram represents the states in which the mobile station 12, shown in FIGS. 1 and 2, is operable. The mobile station is operable in an idle node 124 in which the mobile station is powered on but is not selected to transmit data. When selection is made to transmit data, a path 126 is taken to the ready state 128. During normal procedures, when the mobile station is selected to transmit data, an access burst is generated by the mobile station, and the mobile station is assigned, by the network, a receive channel assignment. When in the ready state, data is transmitted, as indicated by the path 132. When no more data is to be transmitted, and a timer times out, the path 134 is taken to the standby state 136. If more data is later selected to be transmitted, the mobile station is returned to the ready state, indicated by the path 138. Also, through operation of an embodiment of the present invention, when a more optimal assignment is provided to the mobile station, a path, here identified by 140, is also taken back to the ready state whereat, in such state, the data is subsequently transmitted.

Figure 4:
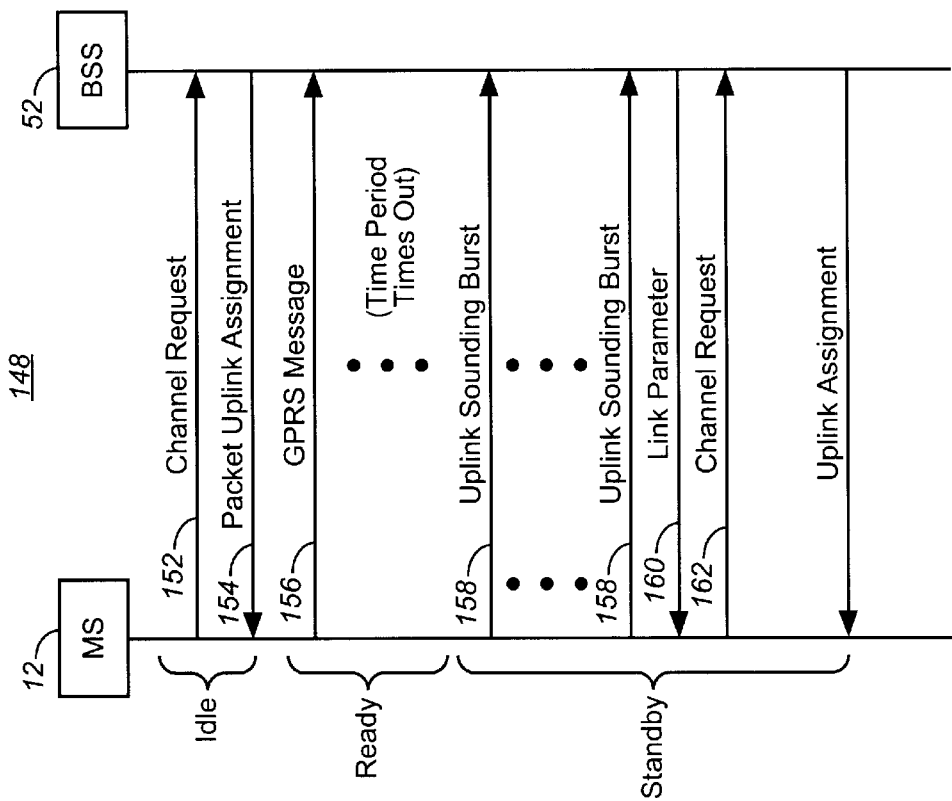
FIG. 4 illustrates a message sequence diagram listing the sequence of message transmission during operation of an embodiment of the present invention.

FIG. 4 illustrates a message sequence diagram, shown generally at 148, which shows the message signaling between the mobile station 12 and the base station system 52 during operation of an embodiment of the present invention.

First, and as indicated by the segment 152, starting in an idle state, the mobile station initiates communication by sending a channel request message which is communicated to the base station system. Responsive thereto, the base station system assigns a packet uplink channel to the mobile station and communicates a packet uplink assignment, indicated by the segment 154, to the mobile station. Thereafter, the mobile station enters the ready state, and as indicated by the segment 156, a GPRS message is sent by the mobile station to the base station system. After a selected time period time out, without transmission of additional messages, the mobile station enters a standby state. Uplink sounding bursts are subsequently generated by the mobile station and transmitted, indicated by the segment 158, to the base station system. At the base station system, the sounding bursts are analyzed and one or more link parameters to be exhibited by a subsequently-generated uplink message are selected at the network infrastructure. Thereafter, and as indicated by the segment 160, a link parameter indication signal is returned to the mobile station to instruct the mobile station as to the values of the one or more link parameters selected at the base station system. Subsequently, when the mobile station initiates communication with the BSS, a channel request, indicated by the segment 162, is generated. And, responsive thereto, an uplink assignment, indicated by the segment 164, is generated. If the network initiates communication, the channel request is not generated by the mobile station.

Figure 5:
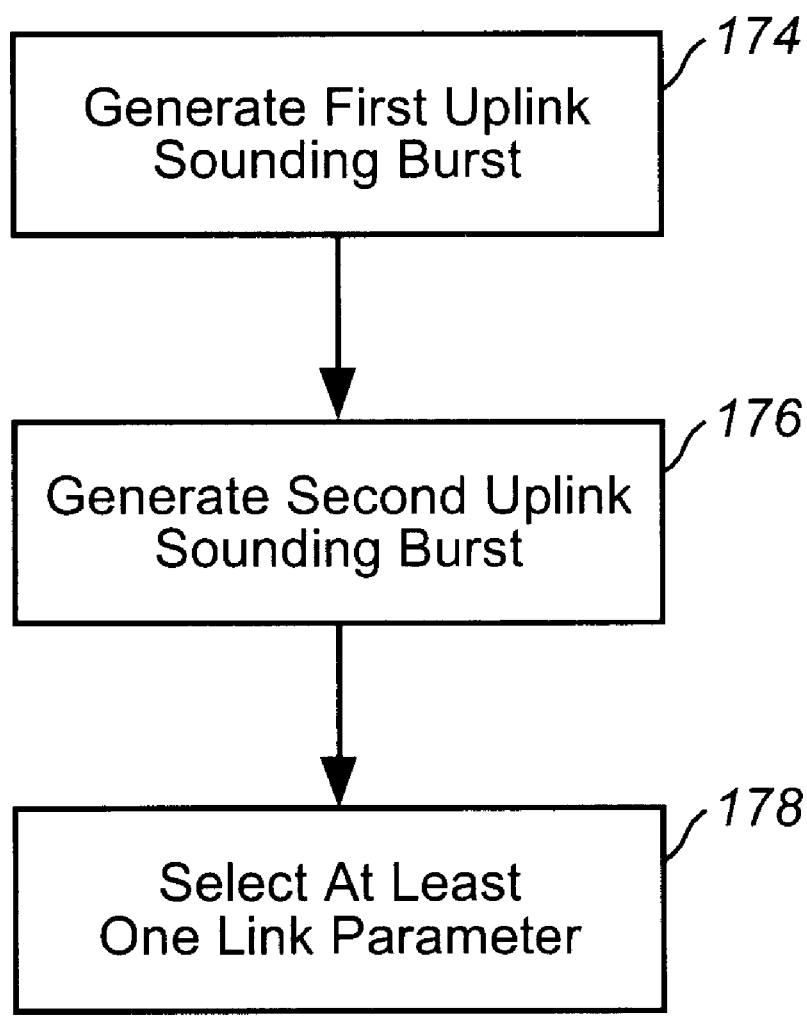
FIG. 5 illustrates a method flow diagram listing the method steps of the method of operation of an embodiment of the present invention.

FIG. 5 illustrates a method, shown generally at 172, of an embodiment of the present invention. The method facilitates setting of link parameters to communicate communication qualities of communications by a mobile station operable in a radio communication system.

First, and as indicated by the block 174, a first uplink channel sounding burst is generated at the mobile station. Then, and as indicated by the block 176, at least a second uplink channel sounding burst is generated at the mobile station and sent to the network infrastructure.

Thereafter, and as indicated by the block 178, at least one parameter is selected to be exhibited by communication signals generated by the mobile station responsive to detection at the network infrastructure of the first and at least second uplink channel sounding bursts.

The preferred descriptions are of preferred examples for implementing the invention, and the scope of the invention should not necessarily be limited by this description. The scope of the present invention is defined by the following claims.

We claim:

1. In a radio communication system having network infrastructure with which a mobile station communicates by way of a radio link upon which an uplink channel and a downlink channel are defined, the mobile station operable alternately in a ready state and a non-ready state, an improvement of apparatus for the mobile station for facilitating setting of link parameters when the mobile station is operated in the non-ready state to improve communication qualities of communication by the mobile station with the network infrastructure, said apparatus comprising:
   a burst signal generator for generating and transmitting uplink channel sounding bursts to the network infrastructure when the mobile station is operated in the non-ready state according to a predetermined schedule; and
   a burst signal controller coupled to receive indications instructing the mobile station of the predetermined schedule at which said burst signal generator generates the uplink channel sounding bursts, said burst signal controller operable responsive thereto to control when said burst signal generator generates the uplink channel sounding bursts.

2. In the radio communication system of claim 1, a further improvement of apparatus for the network infrastructure, said apparatus comprising:
   a burst signal detector coupled to receive indications of the burst signals transmitted by said burst signal generator and for determining values representative of the burst signals;
   a link parameter selector coupled to receive indications of the values representative of the burst signals, said link parameter selector for selecting at least one link parameter to be exhibited by communication signals generated by the mobile station; and
   a parameter link signal generator coupled to said link parameter selector, said parameter link signal generator for generating a parameter link signal for transmission upon the forward link to the mobile station to instruct the mobile station to cause communication signals generated thereat to exhibit the at least one parameter.

3. The apparatus of claim 2 wherein said link parameter selector comprises an uplink channel estimator coupled to receive the indications of the values representative of the burst signals, said uplink channel estimator for estimating at least one channel characteristic associated with transmission of the sounding bursts upon the uplink channel the at least one link parameter selected responsive to estimation of the at least one uplink channel characteristic.

4. The apparatus of claim 3 wherein the channel characteristic comprises an indicia of path loss upon the uplink channel.

5. The apparatus of claim 3 wherein the channel characteristic comprises an indicia of a speed at which the mobile station is traveling when the sounding bursts are transmitted upon the uplink channel.

6. The apparatus of claim 3 wherein the channel characteristic comprises an indicia of position of the mobile station when the sounding bursts are transmitted upon the uplink channel.

7. The apparatus of claim 2 wherein the link parameter selected by said link parameter selector comprises a coding rate at which the communication signals generated by the mobile station are to be encoded.

8. The apparatus of claim 2 wherein the link parameter selected by said link parameter selector comprises a modulation format by which the communication signals generated by the mobile station are to be modulated.

9. The apparatus of claim 2 wherein the link parameter selected by said link parameter selector comprises a power control step size by which power levels of the communication signals generated by mobile station are to be altered.

10. The apparatus of claim 2 wherein the link parameter selected by said link parameter selector comprises a retransmission limit for limiting retransmission of the communication signals generated by the mobile station.

11. The apparatus of claim 2 wherein said apparatus further comprises a sounding-schedule message generator for generating and transmitting a sounding-schedule message to the mobile station, the soundings-schedule message forming the indication to which said burst signal controller is coupled to receive and which instructs the mobile station of the selected times at which said burst signal generator generates the uplink channel sounding bursts.

12. The apparatus of claim 11 wherein the mobile station is identified by a sequence of digits and wherein the sounding-schedule message generated and transmitted by said sounding-schedule message generator assigns the mobile station to a selected sounding schedule corresponding to a value of at least one of the sequence of digits.

13. The apparatus of claim 2 wherein the non-ready state comprises a standby state, wherein the uplink channel sounding bursts generated by said burst signal generator are generated when the mobile station is in the standby state, and wherein the communication signals generated by the mobile station of which said link parameter selector selects the link parameter thereof are generated when the mobile station is in the ready state.

14. The apparatus of claim 1 wherein the mobile station is operable to generate an access burst and wherein the uplink channel sounding bursts generated by said burst signal generator comprise shortened versions of the access burst.

15. In a method for communicating in a radio communication system having network infrastructure with which a mobile station communicates by way of a radio link upon which an uplink channel and a downlink channel are defined, the mobile station operable alternately in a ready state and a non-ready state, an improvement of a method for the mobile station when operated in a non-ready state for facilitating setting of link parameters to improve communication qualities of communications by the mobile station with the network infrastructure, said method comprising:

sending a first uplink channel sounding burst generated at the mobile station to the network infrastructure;

sending at least a second uplink channel sounding burst generated at the mobile station to the network infrastructure; and selecting, responsive to detection at the network infrastructure of the first and at least second uplink channel, at least one link parameter to be exhibited by communication signals generated by the mobile station.

16. The method of claim 15 further comprising the additional operation of transmitting a parameter link signal to the mobile station by the network infrastructure, the parameter link signal of values instructing the mobile station to cause the communication signals generated thereat to exhibit the at least one link parameter.

17. The method of claim 15 further comprising the initial operation of determining, at the network infrastructure, a schedule according to which the first and at least second burst signals are sent.

18. The method of claim 17 further comprising the additional operations, subsequent to said operation of determining a schedule according to which the first and at least second burst signals are sent, of transmitting an indication of schedule to the mobile station and of detecting at the mobile station the indication of the schedule.

19. The method of claim 15 further comprising the intermediary operation, prior to said operation of selecting the at least one link parameter, of estimating at least one channel characteristic associated with transmission of the sounding bursts upon the uplink channel.

20. In a radio communication system having network infrastructure with which a mobile station communicates by way of a radio link upon which an uplink channel and a downlink channel are defined, the mobile station operable alternately in a ready state and a non-ready state, an improvement of apparatus for the network infrastructure for facilitating setting of link parameters to improve communication qualities of communications by the mobile station with the network infrastructure, said apparatus comprising:

a burst signal detector coupled to receive indications of burst signals generated by the mobile station and for determining values representative of the burst signals;

a link parameter selector coupled to receive indications of the values representative of the burst signals, said link parameters selector for selecting at least one link parameter to be exhibited by communication signals generated by the mobile station; and a parameter link signal generator coupled to said link parameter selector, said parameter link signal generator for generating a parameter link signal for transmission upon the forward link to the mobile station to instruct the mobile station to cause communication signals generated thereat to exhibit the at least one link parameter.

* * * * *